Figures 1, 2:
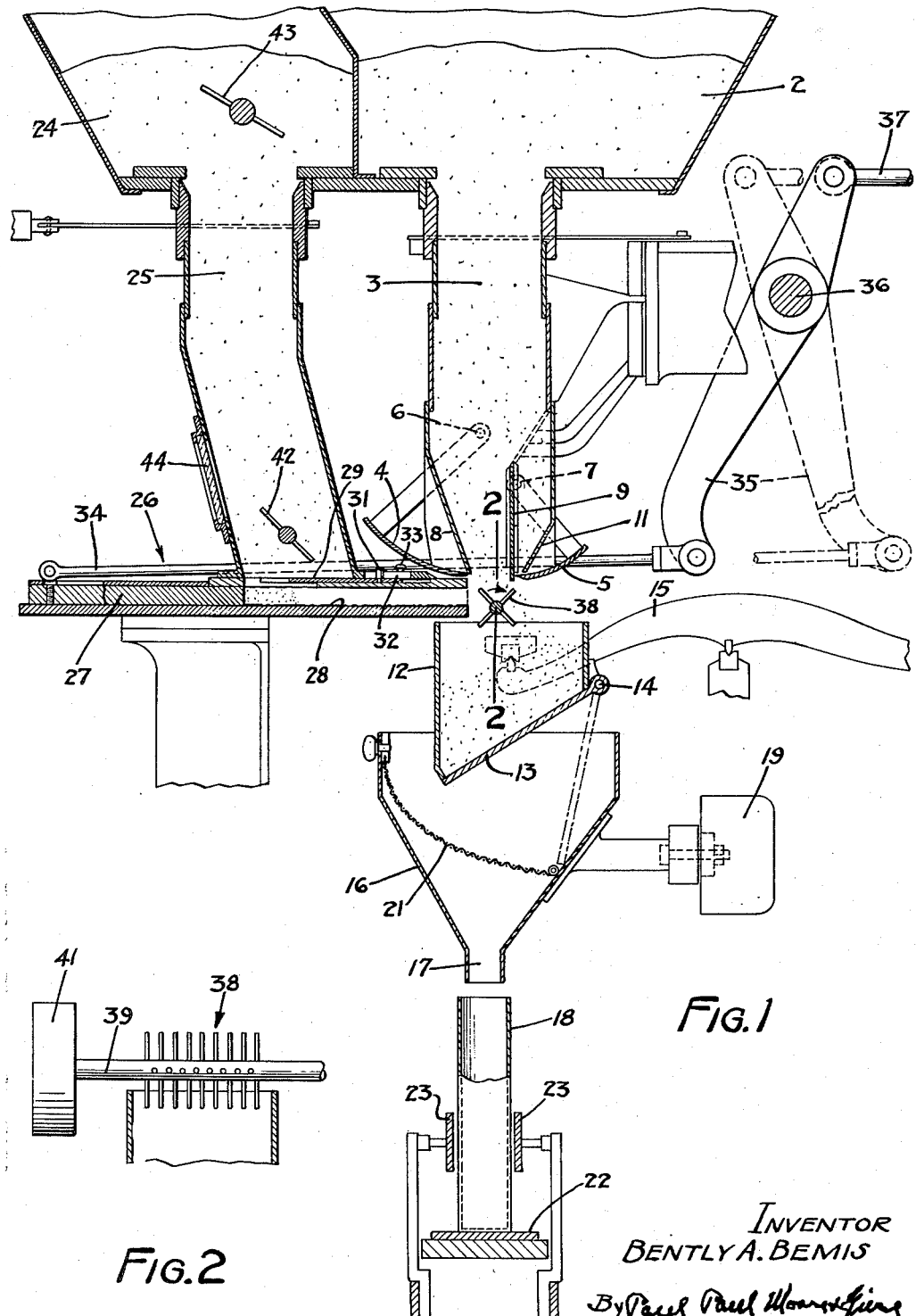

March 26, 1940.  B. A. BEMIS  2,194,633

PACKAGING MACHINE

Filed July 5, 1938

INVENTOR
BENTLY A. BEMIS

ATTORNEYS

Patented Mar. 26, 1940

2,194,633

UNITED STATES PATENT OFFICE 2,194,633

PACKAGING MACHINE

Bently A. Bemis, Minneapolis, Minn., assignor to The Cream of Wheat Corporation, Minneapolis, Minn., a corporation of Delaware Application July 5, 1938, Serial No. 217,413

2 Claims. (Cl. 221—96)

This invention relates to new and useful improvements in packaging machines and more particularly to such apparatus of the weighing and filling type.

An object of the present invention is to provide a mechanism adapted for use in connection with a weighing and filling machine, whereby other materials may be intermixed with the stock material in regulated quantities simultaneously as the stock material is delivered into the package or container.

A further object is to provide a weighing and filling machine comprising a main chute having a connection with a supply hopper and provided at its lower end with means for controlling the delivery of material therefrom into the usual weighing hopper, and an auxiliary chute being disposed adjacent to said main chute and having means for introducing a material of different characteristics into the stream of stock material, prior to delivering the stock material into the usual package or container.

A further object is to provide a weighing and filling machine comprising a gravity feed main chute and an auxiliary chute connected at its lower end with the main chute, and a rotary mixing device being mounted at the juncture between said chutes for thoroughly intermixing the two materials as they are delivered into the usual weighing hopper of the apparatus, whereby the added material will be uniformly intermixed with the stock material, in the operation of filling the packages.

A further object is to provide a mechanism which may readily be applied to a conventional weighing and filling machine in the form of an attachment, and which serves to introduce a predetermined quantity of other material into the stock material to change the characteristics thereof, simultaneously as the stock material is delivered into the package or container.

Other objects of the invention reside in the novel construction of the auxiliary chute for introducing an added material into the stream of stock material, whereby said auxiliary chute may readily be applied to a conventional weighing and filling machine; in the novel arrangement of the auxiliary feed chute, whereby the added material is forcibly fed into the main stream of stock material in measured quantities and thoroughly intermixed therewith; in the provision of an attachment for introducing a material of different characteristics into the main stream of stock material, which attachment is provided with means for accurately controlling the delivery of added material therefrom into the stream of stock material, whereby the finished material delivered into the usual carton or receptacle, will contain the desired percentage of added material, and which added material will be uniformly intermixed with the stock material; and, in the simple and inexpensive construction of the attachment for introducing added material into the stock material, whereby said attachment readily lends itself for manufacture at small cost.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a vertical sectional view showing the invention as applied to a conventional weighing and filling machine; and Figure 2 is a detail sectional view substantially on the line 2—2 of Figure 1, showing the position of the mixing device over the usual weighing hopper.

In the selected embodiment of the invention here shown, there is illustrated in Figure 1, for purposes of disclosure, a conventional weighing and filling machine comprising the usual supply hopper 2 having the upper end of a chute 3 connected thereto. The lower end of this chute is provided with the usual closure gates 4 and 5, shown pivotally supported on pivots 6 and 7, respectively, and whereby the flow of material from the chute may be accurately controlled. The lower end of the chute 3 is shown having an inclined wall portion 8 which serves to direct the material inwardly, as will readily be understood by reference to Figure 1. A partition 9 is also provided in the lower end of the main chute 3, and the adjacent side wall of the chute terminates at its lower end in an inclined wall 11 whose lower edge portion is bent inwardly and is spaced from the partition 9, as shown.

The usual weighing hopper 12 is shown positioned beneath the discharge end of the main chute 3, and has the usual hinged bottom 13 pivotally supported at 14. The weighing hopper 12 is supported upon one end of a scale beam 15 in the usual manner. The scale beam 15 forms no part of the present invention and it is therefore thought unnecessary to herein show the same in detail. Beneath the weighing hopper 12, there is provided a filling hopper 16 having a filling spout 17 which is adapted to be disposed over the mouth of an empty carton 18, as shown.

To prevent the material from becoming lodged in the filling hopper 16, a suitable vibrating mechanism, generally indicated by the numeral 19, is shown connected thereto. This vibrating mechanism constantly imparts a vibratory or shaking motion to the filling hopper 16, whereby the material discharged thereinto from the weighing hopper 12, will readily pass through the screen 21 of the hopper and into the open receptacle or container 18 positioned beneath the filling spout 17 of the hopper.

The screen 21 serves to break up or separate any particles of the material which may tend to adhere together whereby the material delivered into the container will be uniform in consistency. The container or receptacle 18 may be supported upon a suitable conveyer or other support, generally indicated by the numeral 22, provided with suitable side rails 23, as shown.

An important feature of the present invention resides in the novel means provided for introducing into the main stream of stock material, a material differing in characteristics from the stock material, whereby the characteristic of the packaged material may be changed, if desired. For convenience, the material introduced into the stream of stock material, will hereinafter be referred to as "added material", and I wish it clearly understood that this expression is intended to cover any ingredient which it may be found desirable to intermix with the stock material to change its characteristics.

The mechanism provided for thus introducing an added material into the stock material, is shown comprising an auxiliary hopper 24 having a chute 25 leading therefrom. A suitable feeding mechanism, generally indicated by the numeral 26, is provided at the lower end of the chute 25. The feeding mechanism 26, as shown, comprises a suitable plunger 27 slidable in a guide 28 having an upper wall portion 29 which is adjustably supported upon the upper wall of the guide 28. The wall portion 29 is shown having a stud 31 slidable in a slot 32. A suitable screw or other securing element 33 is provided for securing the wall portion or slide 29 in adjusted position. By referring to the drawing, it will be noted that the wall portion 29 projects into the chute 25 and, by reason of its adjustment provides means for varying the flow of material from the chute 25 into the path of the plunger 27.

The plunger 27 may be operated by a suitable connecting rod 34 having one end pivotally connected thereto and its opposite end connected to an arm 35 mounted on a shaft 36 supported in suitable bearings of the machine frame, not shown. The arm 35 may be actuated by a suitable connection 37 having one end operatively connected to a driving mechanism, not shown. In practice, two connecting rods 34 are preferably used, one on each side of the chute 25.

Another feature of the invention resides in the provision of means for intermixing the added material with the stock material, simultaneously as the two materials are delivered into the weighing hopper 12. The means provided for thus intermixing the two materials is shown comprising a mixing wheel, generally indicated by the numeral 38. This wheel is mounted directly above the weighing hopper 12, so that the two materials must contact therewith, as they are discharged from their respective chutes 3 and 25, for delivery into the weighing hopper. The mixing wheel 38 is shows provided with a shaft 39 having a pulley 41 secured thereto, which may be connected to the usual driving mechanism of the machine, not shown.

To prevent the added material from bridging or becoming congested in the chute 25, suitable agitators 42 and 43 are provided in the chute 25 and hopper 24, respectively. These agitators are driven at a suitable speed, whereby the material is constantly agitated so that it cannot become congested in the chute 25.

The novel mechanism, herein disclosed, is very simple and inexpensive in construction, and it is so designed that it may readily be applied to a conventional weighing and filling machine at small cost. If desired, it may be embodied directly in the construction of the weighing machine.

A suitable window 44 is shown provided in a wall of the auxiliary chute 25, whereby the action of the material immediately above the plunger 27 may conveniently be observed. This window is preferably detachably mounted so that access may be had to the lower end of the chute 25, when necessary.

In the operation of the apparatus, the gates or closures 4 and 5 provided at the lower end of the main chute 3, are regulated to permit the desired flow of stock material into the weighing hopper 12. The gate 5 operates to control the dribble feed of the stock material, as is customary in machines of this general type. The gates 4 and 5 operate automatically, and are controlled by operation of the weighing hopper 12 or scale beam 15, so that when the weighing hopper has received a full load and is operated to discharge its load, the closures 4 and 5 automatically close to prevent further discharge of the stock material into the weighing hopper during the period that it is discharging its measured load into the filling hopper 16. The mechanism for thus operating the closures 4 and 5 is well known in the art, and as it forms no part of the present invention, it is thought unnecessary to herein disclose the same in detail.

The operation of the plunger is also so timed that the plunger will not deliver any material into the weighing hopper while it is discharging its contents. The amount of added material introduced into the stream of stock material discharging into the weighing hopper 12 is, as previously stated, controlled by the position of the plate or wall 29. In some instances, it may be desired to intermix a relatively greater proportion of the added material with the stock material and, in some cases, the proportion of added material introduced into the stock material may be very small, depending upon the characteristics of the added material and the desired characteristics of the resultant or finished material delivered into the package 18.

Thus, by the application to a weighing and filling machine, of the novel apparatus or attachment herein disclosed, the characteristics of the packaged material may readily and conveniently be changed to any degree, as may be desired, by the introduction of other ingredients into the stream of stock material, simultaneously as the material is delivered into the package or container.

I claim as my invention:
1. In an apparatus of the class described, a main chute having means for controlling the flow of material therefrom, means at the discharge end of the chute for introducing another material into the stock material in measured quantities, and rotary means for thoroughly intermixing the added material with the stock material, whereby the characteristics of the resultant material are changed.

2. In an apparatus of the class described, a main chute having means for controlling the flow of material therefrom, an auxiliary chute having its discharge end disposed adjacent to the discharge end of the main chute, a plunger for intermittently feeding added material from the auxiliary chute into the stream of stock material discharging from the main chute, a slide disposed over the plunger for regulating the the quantity of added material delivered to the stock material, and whereby the added material may be introduced into the stream of stock material in accurately measured quantities, and a mixing wheel mounted at the discharge ends of said chutes for thoroughly intermixing the two materials, whereby the resultant product will be substantially uniform in consistency.

BENTLY A. BEMIS.